United States Patent
Sakaguchi et al.

(10) Patent No.: US 12,421,565 B2
(45) Date of Patent: Sep. 23, 2025

(54) LOW THERMAL EXPANSION CAST STEEL AND METHOD OF PRODUCTION OF SAME

(71) Applicant: SHINHOKOKU MATERIAL CORP., Kawagoe (JP)

(72) Inventors: Naoki Sakaguchi, Kawagoe (JP); Haruyasu Ohno, Kawagoe (JP); Kotaro Ona, Kawagoe (JP)

(73) Assignee: SHINHOKOKU MATERIAL CORP., Kawagoe (JP)

(*) Notice: Subject to any disclaimer, the term of this patent is extended or adjusted under 35 U.S.C. 154(b) by 419 days.

(21) Appl. No.: 17/800,421

(22) PCT Filed: Apr. 27, 2020

(86) PCT No.: PCT/JP2020/017997
§ 371 (c)(1),
(2) Date: Aug. 17, 2022

(87) PCT Pub. No.: WO2021/220352
PCT Pub. Date: Nov. 4, 2021

(65) Prior Publication Data
US 2023/0082149 A1 Mar. 16, 2023

(51) Int. Cl.
C21D 6/00 (2006.01)
C22C 38/02 (2006.01)
C22C 38/04 (2006.01)
C22C 38/10 (2006.01)

(52) U.S. Cl.
CPC ............ *C21D 6/008* (2013.01); *C21D 6/001* (2013.01); *C21D 6/005* (2013.01); *C21D 6/007* (2013.01); *C22C 38/02* (2013.01); *C22C 38/04* (2013.01); *C22C 38/105* (2013.01)

(58) Field of Classification Search
None
See application file for complete search history.

(56) References Cited

U.S. PATENT DOCUMENTS

| | | | |
|---|---|---|---|
| 4,832,908 A | 5/1989 | Ishikawa et al. | |
| 4,853,298 A | 8/1989 | Harner et al. | |
| 2003/0051775 A1 | 3/2003 | Suganuma et al. | |
| 2006/0037671 A1* | 2/2006 | Park | C25D 3/562 |
| | | | 148/336 |

FOREIGN PATENT DOCUMENTS

| | | | | |
|---|---|---|---|---|
| CN | 105296846 A | | 2/2016 | |
| JP | 6-172919 A | | 6/1994 | |
| JP | 11-279709 A | | 10/1999 | |
| JP | 11-293413 A | | 10/1999 | |
| JP | 2003-73780 A | | 3/2003 | |
| JP | 2015-163728 A | | 9/2015 | |
| JP | 2016027187 A | * | 2/2016 | ............ C21D 6/001 |
| JP | 2017-145456 A | | 8/2017 | |
| JP | 2016-27187 A | | 2/2018 | |
| WO | WO 01/59169 A1 | | 8/2001 | |
| WO | WO 2015/136766 A1 | | 9/2015 | |
| WO | WO 2019/244962 A1 | | 12/2019 | |

OTHER PUBLICATIONS

Structural Mechanism of Reverse α → γ Transformation and Strengthening of Fe—Ni Alloys the Physics of Metals and Metallography, 2014, vol. 115, No. 7, pp. 661-671. (Year: 2014).*
International Search Report (Form PCT/ISA/210) for International Application No. PCT/JP2020/017997, dated Jul. 21, 2020.
Written Opinion of the International Searching Authority (Form PCT/ISA/237) for International Application No. PCT/JP2020/017997, dated Jul. 21, 2020, with an English translation.

* cited by examiner

*Primary Examiner* — Jenny R Wu
(74) *Attorney, Agent, or Firm* — Birch, Stewart, Kolasch & Birch, LLP

(57) ABSTRACT

An object of the present invention is to provide a low thermal expansion cast steel having a high yield strength at room temperature, a high rigidity, and a low coefficient of thermal expansion. The low thermal expansion cast steel of the present invention is obtained by suitably heat treating a cast steel comprising, by mass %, C: 0 to 0.1%, Si: 0 to 0.5%, Mn: 0 to 0.5%, S: 0 to 0.05%, Ni: 29.0 to 34.0%, Co: 0 to 8%, and a balance of Fe and unavoidable impurities so that the 0.2% proof stress becomes 350 MPa or more, the Young's modulus becomes 130 GPa or more, and the average coefficient of thermal expansion at 18 to 28° C. becomes $2.0 \times 10^{-6}$/° C. or less.

4 Claims, 1 Drawing Sheet

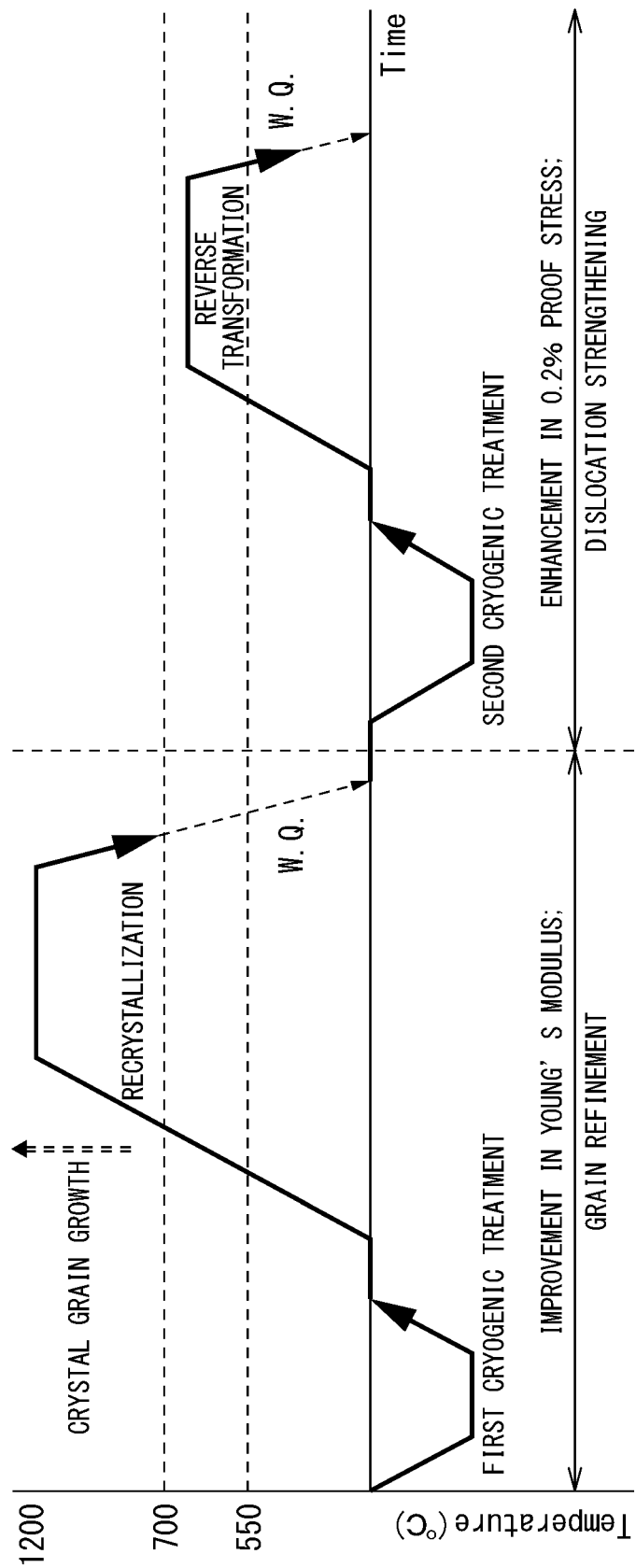

LOW THERMAL EXPANSION CAST STEEL AND METHOD OF PRODUCTION OF SAME

FIELD

The present invention relates to a low thermal expansion cast steel and method of production of the same, more particularly relates to a low thermal expansion cast steel having high rigidity and high strength.

BACKGROUND

The thermally stable invar alloy is widely used as a material for members for electronics, semiconductor-related equipment, laser processing apparatuses, and ultraprecision machining equipment. However, there has been a problem in conventional invar alloy in that the Young's modulus is a small one of about half of that of general steel. For this reason, it had been necessary to design such components to have high rigidity such as by increasing the thickness.

On the other hand, low thermal expansion cast steels are also being used in parabolic antennas used in transmitting and receiving equipment etc., but such equipment has become extremely large in size. There has been demand for materials with low thermal expandability of course as well as high shaping precision, that is, castability, machinability, vibration absorption performance, mechanical strength, etc. For example, carbon fiber-reinforced plastic (CFRP), which has high rigidity and corrosion resistance, is generally used for antenna reflectors.

The coefficient of thermal expansion of CFRP is $1.5 \times 10^{-6}/°C$., which is extremely low. To secure high dimensional precision after shaping, it is necessary for the shaping die to be formed from material having a same extent of coefficient of thermal expansion. For this reason, invar alloy or super invar alloy is selected as the material for the shaping die.

PTL 1 discloses a high rigidity, low thermal expansion cast steel which has a high Young's modulus even as cast and has a temperature of martensite transformation (Ms point) lower than in the past invented for the objective of producing a cast steel for a member having a complicated shape requiring low thermal expansion and high rigidity.

On the other hand, with respect to a low thermal expansion alloy having high yield strength at high temperature, PTL 2 discloses using for a shaping die a low thermal expansion comprising cast iron having a graphite structure in austenite base iron, containing, as a chemical composition indicated by mass %, solid solution carbon in 0.09% or more and 0.43% or less, silicon in less than 1.0%, nickel in 29% or more and 34% or less, and cobalt in 4% or more and 8% or less, and a balance of iron, and having a coefficient of thermal expansion in a temperature range of 0 to 200° C. of $4 \times 10^{-6}/°C$. or less.

PTL 3 discloses using for a member for ultraprecision equipment including a CFRP alloy an alloy steel excellent in thermal dimensional stability and rigidity having a chemical composition containing C: 0.1 wt % or less, Si: 0.1 to 0.4 wt %, Mn: 0.15 to 0.4 wt %, Ti: more than 2 to 4 wt %, Al: 1 wt % or less, Ni: 30.7 to 43.0 wt %, Co: 14 wt % or less, having contents of Ni and Co satisfying formula (1) below, and comprising a balance of Fe and unavoidable impurities, and having a coefficient of thermal expansion in a temperature range of −40 to 100° C. of $4 \times 10^{-6}/°C$. or less and a Young's modulus of 16100 kgf/mm² or more.

CITATION LIST

Patent Literature

[PTL 1] Japanese Unexamined Patent Publication No. 2016-027187
[PTL 2] Japanese Unexamined Patent Publication No. 6-172919
[PTL 3] Japanese Unexamined Patent Publication No. 11-293413

SUMMARY

Technical Problem

As explained above, low thermal expansion alloys with high yield strength at high temperature and low thermal expansion alloys with high rigidity are known, but a low thermal expansion cast steel that is suitable for die materials for CFRP having complicated shapes, spindles, etc., can be produced by casting, and has a high yield strength at room temperature and high rigidity has not been developed.

The present invention has as its object, in consideration of the above situation, the provision of a low thermal expansion cast steel having high yield strength at room temperature, further having high rigidity, and having a low coefficient of thermal expansion.

Solution to Problem

The inventors diligently studied methods for achieving a low thermal expansion cast steel having both high rigidity and high yield strength. As a result, they have discovered that by applying suitable heat treatment to a cast steel containing a predetermined amount of Ni, it is possible to increase rigidity and yield strength.

The present invention was made based on this finding and has as its gist the following.

(1) A low thermal expansion cast steel characterized by comprising a chemical composition containing, by mass %, C: 0 to 0.1%, Si: 0 to 0.5%, Mn: 0 to 0.5%, S: 0 to 0.05%, Ni: 29.0 to 34.0%, Co: 0 to 8.0%, and a balance Fe and unavoidable impurities and having a 0.2% proof stress at 23° C. of 350 MPa or more, a Young's modulus of 130 GPa or more, and an average coefficient of thermal expansion at 18 to 28° C. of $2.0 \times 10^{-6}/°C$. or less.

(2) The low thermal expansion cast steel of (1) wherein an average grain size of an austenitic structure of the low thermal expansion cast steel is more than 100 μm and less than 800 μm.

(3) A method for producing a low thermal expansion cast steel characterized by comprising, in order,
 a first cryogenic treatment step of cooling a cast steel having a chemical composition of (1) from room temperature to the Ms point or below, holding it at a temperature less than or equal to the Ms point for 0.5 to 3 hours, and raising it to room temperature,
 a recrystallization step of heating the cast steel to 800 to 1200° C., holding it for 0.5 to 5 hours, then quenching,
 a second cryogenic treatment step of cooling the cast steel from room temperature to the Ms point or below, holding it at a temperature of the Ms point or less for 0.5 to 3 hours, and raising it to room temperature, and
 a reverse transformation step of heating the cast steel to 550 to 700° C., holding for 0.5 to 5 hours, and then quenching.

Advantageous Effects of the Invention

According to the present invention, a low thermal expansion cast steel having a high yield strength, a high rigidity, and a low coefficient of thermal expansion can be obtained.

BRIEF DESCRIPTION OF DRAWINGS

FIG. 1 is a view showing a summary of the heat treatments in the method for producing the low thermal expansion cast steel of the present invention.

DESCRIPTION OF EMBODIMENTS

Below, the present invention will be explained in detail. Below, percentages relating to the chemical composition are expressed as mass % unless otherwise noted. First, the chemical composition of the alloy of the present invention will be explained.

Ni is an essential element which reduces the coefficient of thermal expansion. The coefficient of thermal expansion will not be small enough if there is too much or too little an amount of Ni. Further, if the amount of Ni is too great, inducing martensitic transformation with cooling will become difficult. Taking the above into consideration, the amount of Ni is in the range of 29.0 to 34.0%.

Elements other than Ni are not essential additive elements but may be added as needed as indicated below.

Co contributes to reducing the coefficient of thermal expansion by combination with Ni. To achieve the desired coefficient of thermal expansion, the range of Co is 0 to 8.0%.

Mn is added as a deoxidant. Further, it also contributes to an improvement in strength by solution strengthening. To achieve this effect, an amount of Mn of 0.1% or greater is preferable. Even if the content of Mn is over 0.5%, the effect is saturated and it becomes difficult to induce martensitic transformation, so the amount of Mn is made 0.5% or less, preferably 0.3% or less.

C forms a solid solution in austenite and contributes to an increase in strength. If the content of C becomes larger, the coefficient of thermal expansion becomes larger and further it becomes difficult to induce a martensitic transformation, so the content is made 0.1% or less.

Si is added as a deoxidant. If the amount of Si is over 0.5%, the coefficient of thermal expansion will increase, so the amount of Si is made 0.5% or less, preferably 0.3% or less. To improve the fluidity of the melt, Si is preferably included in 0.1% or more.

S may be included for the purpose of improving machinability. However, it forms FeS and crystallizes at the crystal grain boundary to become a cause of hot brittleness, so the content of S is made 0.05% or less.

The balance in the chemical composition is Fe and unavoidable impurities. Unavoidable impurities mean constituents that enter unavoidably from raw materials, the production environment, etc., when industrially producing steel having the chemical composition prescribed in the present invention.

The structure of the cast steel of the present invention is an austenitic structure having an average grain size more than 100 µm and less than 800 µm. The structure mainly comprises equiaxed crystals having a variety of crystal orientations. As a result, a fixed amount or more of crystals with crystal orientations of (111), (110), etc. which have a high Young's modulus are included. As a result, a Young's modulus higher compared to that of a normal low thermal expansion cast steel comprising mainly columnar crystals having the crystal orientation of (100) which has a low Young's modulus can be obtained While it is not necessary for the entire structure to be formed from equiaxed crystals, the percentage of the area taken up by equiaxed crystals in area ratio is preferably 60% or more. The percentage of the area taken up by equiaxed crystals in area ratio is more preferably 90% or more, more preferably 95% or more.

The excellent yield strength of the low thermal expansion cast steel of the present invention can be evaluated from the results of a tensile test at 23° C. Specifically, the low thermal expansion cast steel of the present invention has the property of having a 0.2% proof stress measured in a tensile test at 23° C. of 350 MPa or more.

In a normal low thermal expansion cast steel as well, the Young's modulus and coefficient of thermal expansion can be adjusted to a certain extent by adjusting the chemical composition. However, the Young's modulus and coefficient of thermal expansion are essentially in a trade-off relationship. That is, they are in a relationship in which the coefficient of thermal expansion also increases if the Young's modulus increases.

In the low thermal expansion cast steel of the present invention, a Young's modulus of 130 GPa or more can be obtained.

The low thermal expansion cast steel of the present invention can further obtain a low coefficient of thermal expansion in which the average coefficient of thermal expansion at 18 to 28° C. is $2.0 \times 10^{-6}$/° C. or less.

Next, the method for producing the high rigidity, low thermal expansion cast steel of the present invention will be explained.

The casting mold used for the high rigidity, low thermal expansion cast steel of the present invention and the apparatus and method for injecting molten steel into the casting mold are not particularly limited. Well known apparatuses and methods may be used. The structure of the cast steel produced by the casting mold is a mainly a columnar structure. The following heat treatments are applied to this cast steel.

First, the cast steel is cooled to the Ms point or less, held at a temperature of the Ms point or less for 0.5 to 3 hours, and then raised to room temperature (first cryogenic treatment step). The method of cooling is not particularly limited. Note that, the Ms point referred to here is the Ms point at a stage before the effect of the present invention is manifested. It is enough that the cooling temperature be sufficiently below the Ms point, so there is no need for the exact Ms point to be known at this stage. Generally, the Ms point can be estimated with the following formula using the constituents of the steel.

$$Ms = 521 - 353C - 22Si - 24.3Mn - 7.7Cu - 17.3Ni - 17.7Cr - 25.8Mo$$

Here, C, Si, Mn, Cu, Ni, Cr, and Mo represent the contents (mass %) of the elements. Elements not included are indicated as 0.

In the case of the chemical composition of the high rigidity, low thermal expansion cast steel of the present invention, the Ms point calculated with the above formula is particularly dependent on the amount of Ni and will be from room temperature to −100° C. or less, therefore dry ice, methyl alcohol, or ethyl alcohol can be used as a cooling medium for up to −80° C. Further, a method of immersing the cast steel in liquid nitrogen or a method of spraying liquid nitrogen can be used at low temperatures of up to −196° C. Due to this, a structure containing martensite is formed. Further, the temperature can be increased by raising the cast steel up in an atmosphere at room temperature.

Next, the cast steel is reheated to 800 to 1200° C., held at 800 to 1200° C. for 0.5 to 5 hours, and quenched to room temperature (recrystallization step). This returns the structure in which martensite is formed to an austenitic structure. The grain size of the structure formed by normal solidification is about 1 to 10 mm, but by going through the above cryogenic treatment step and the subsequent recrystallization step, the austenite grain size becomes finer and the structure becomes a mainly equiaxed structure with a random crystal orientation. Crystal grain growth occurs afterwards. The cooling method is not particularly limited, but water cooling is preferable.

If crystal grain growth does not occur and the austenite crystals become too fine, the austenite will stabilize and the Ms point will be reduced. As a result, the amount of martensite in the subsequent second cryogenic treatment step will be reduced, so in the subsequent reverse transformation step, the desired 0.2% proof stress will become difficult to obtain, therefore the structure is preferably one in which the average grain size of the austenitic structure is more than 100 µm and less than 800 µm. The average grain size is preferably more than 200 µm. Further, the average grain size is preferably less than 600 µm.

Following recrystallization, the cast steel is once again cooled to the Ms point or less, held at a temperature of the Ms point or less for 0.5 to 3 hours, then raised to room temperature (second cryogenic treatment step). The cooling and increase in temperature in the second cryogenic treatment step can be performed in a similar manner to those in the first cryogenic treatment step. Through these treatments, the structure of the cast steel once again becomes a structure including martensite. If the area ratio of martensite is less than 40%, it will be difficult to achieve the desired 0.2% proof stress in the subsequent reverse transformation step, so the amount of martensite after the end of the second cryogenic treatment is preferably 40% or more.

Next, the cast steel is heated to 550 to 700° C., held for 0.5 to 5 hours, and then quenched to room temperature (reverse transformation step) to make the structure austenitic. The cooling method is not particularly limited, but water cooling is preferable. The deformation that occurs when the structure undergoes a martensitic transformation in the second cryogenic treatment step is shear deformation. The strain (dislocations) at this time remains in the structure having become austenitic from the reverse transformation. This makes it possible to achieve a high yield strength of a 0.2% proof stress at 23° C. of 350 MPa or more.

The martensitic structure returns to being austenitic when heated to 550° C. or more, but the austenite will recrystallize from the driving force from the dislocations at a heating temperature of over 700° C., therefore the heating temperature is made 700° C. or less. Note that, the size of the austenite grains does not change due to the second cryogenic treatment step and reverse transformation.

A summary of the above heat treatments is shown in FIG. 1.

Before the first cryogenic treatment step, a solution step may be provided in which the cast steel is heated to 800 to 1200° C., held for 0.5 to 5 hours, and quenched to room temperature. Through solution treatment, precipitates formed during casting dissolve, improving ductility and toughness. The quenching method is not particularly limited, but water cooling is preferable.

Solidification nuclei may be easily formed by including Nb, Ti, B, Mg, Ce, and La as inoculants to the melt at the time of the production of the cast steel. Further, solidification nuclei may be easily formed by coating inoculants such as $Co(AlO_2)$, $CoSiO_3$, and Co-borate on the surface of the casting mold together with the coating material that is normally coated on a casting mold. Further, the melt in the casting mold may be stirred and made to flow by employing a method using an electromagnetic stirring apparatus, a method of mechanically making the casting mold vibrate, a method of making the melt vibrate by ultrasonic waves, etc. By applying these methods, the structure of the cast steel becomes more easily equiaxed, so the high rigidity, low thermal expansion cast steel of the present invention can be more efficiently produced.

EXAMPLES

Melts adjusted to have the chemical composition shown in Table 1 were poured into casting molds to produce Y blocks. The above-mentioned first cryogenic treatment, recrystallization, second cryogenic treatment, and reverse transformation were applied to the obtained cast steel.

In all of the examples where "yes" is marked in the first cryogenic treatment and second cryogenic treatment columns of Table 2, the respective cast steel were treated under conditions of being immersed in liquid nitrogen and held for 1.0 hour. Further, the holding temperatures in the recrystallization step and reverse transformation step are the temperatures in Table 2, and the holding time in all examples was 4.0 hours. Note that, "–" in a heat treatment column indicates that the corresponding treatment was not applied.

Further, "solution" in the heat treatment columns means that cryogenic treatment, recrystallization, and reverse transformation were not applied and that only solution treatment in which the cast steel was heated to 850° C., held for 2.0 hours, then quenched to room temperature was applied.

A Young's modulus test piece (7 t×16 w×125 L), a tensile test piece (based on JIS G 0567), and a thermal expansion test piece (φ6×25 L) were taken from each Y block. The Young's modulus was measured at room temperature using the two point support horizontal resonance method, the 0.2% proof stress was measured using the offset method in the tensile test, and the average coefficient of thermal expansion at 18 to 28° C. was measured using a thermal expansion measurement instrument.

The properties of the obtained cast steels are shown in Table 2. In these examples, a Young's modulus of 130 GPa or more, a 0.2% proof stress at 23° C. of 350 MPa or more, and an average coefficient of thermal expansion at 18 to 28° C. of $2.0×10^{-6}$/° C. or less were judged to be good properties.

From the results, it can be confirmed that applying the predetermined heat treatments to a cast steel having the chemical composition explained above, a low thermal expansion cast steel having high yield strength, high rigidity, and a low coefficient of thermal expansion could be obtained.

TABLE 1

| Steel | C | Si | Mn | S | Ni | Co | |
|---|---|---|---|---|---|---|---|
| 1 | 0.008 | 0.10 | 0.23 | 0.003 | 31.9 | 5.1 | Example |
| 2 | 0.007 | 0.16 | 0.22 | 0.005 | 35.2 | 0.0 | Comparative example |
| 3 | 0.009 | 0.21 | 0.15 | 0.005 | 28.0 | 8.3 | Comparative example |
| 4 | 0.012 | 0.12 | 0.22 | 0.004 | 33.8 | 0.0 | Example |
| 5 | 0.006 | 0.15 | 0.13 | 0.005 | 29.2 | 7.7 | Example |
| 6 | 0.210 | 0.16 | 0.09 | 0.011 | 32.3 | 5.3 | Comparative example |
| 7 | 0.004 | 0.77 | 0.11 | 0.005 | 33.3 | 6.1 | Comparative example |
| 8 | 0.006 | 0.09 | 0.58 | 0.004 | 32.5 | 5.6 | Comparative example |
| 9 | 0.008 | 0.22 | 0.23 | 0.019 | 32.9 | 4.9 | Example |

TABLE 2

| No. | Steel | Heat treatment | | | | Martensite percentage after second cryogenic treatment (%) | Austenite average grain size (μm) | Young's modulus (GPa) | 0.2% proof stress (MPa) | Coefficient of thermal expansion (×10⁻⁶/° C.) | |
| | | First cryogenic treatment | Recrystallization (° C.) | Second cryogenic treatment | Reverse transformation (° C.) | | | | | | |
| --- | --- | --- | --- | --- | --- | --- | --- | --- | --- | --- | --- |
| 1 | 1 | — | 1200 | Yes | 600 | 85 | 422 | 133 | 386 | 0.47 | Example |
| 2 | 1 | Yes | 1000 | Yes | 700 | 65 | 212 | 136 | 353 | 0.14 | Example |
| 3 | 1 | | Solution | | | — | 1625 | 98 | 275 | 0.20 | Comparative example |
| 4 | 1 | Yes | 1200 | — | — | — | 511 | 134 | 280 | 0.14 | Comparative example |
| 5 | 1 | Yes | 830 | — | — | — | 79 | 138 | 290 | 0.21 | Comparative example |
| 6 | 1 | — | — | Yes | 600 | 90 | 1354 | 119 | 371 | 0.31 | Comparative example |
| 7 | 1 | Yes | 750 | Yes | 600 | 35 | 92 | 126 | 314 | 0.51 | Comparative example |
| 8 | 2 | Yes | 1200 | Yes | 600 | 0 | 1565 | 103 | 277 | 1.24 | Comparative example |
| 9 | 2 | | Solution | | | — | 1334 | 102 | 282 | 1.31 | Comparative example |
| 10 | 3 | Yes | 1200 | Yes | 600 | 76 | 369 | 144 | 370 | 2.23 | Comparative example |
| 11 | 3 | | Solution | | | — | 1254 | 99 | 287 | 2.35 | Comparative example |
| 12 | 4 | Yes | 1200 | Yes | 600 | 62 | 519 | 140 | 370 | 1.75 | Example |
| 13 | 4 | Yes | 830 | Yes | 600 | 42 | 201 | 142 | 360 | 1.82 | Example |
| 14 | 4 | Yes | 830 | — | — | — | 85 | 140 | 310 | 1.69 | Comparative example |
| 15 | 4 | | Solution | | | — | 980 | 105 | 280 | 1.81 | Comparative example |
| 16 | 5 | Yes | 1200 | Yes | 600 | 87 | 252 | 142 | 360 | 1.29 | Example |
| 17 | 5 | Yes | 800 | Yes | 600 | 62 | 121 | 142 | 354 | 1.32 | Example |
| 18 | 5 | — | — | Yes | 650 | 92 | 1350 | 105 | 359 | 1.38 | Comparative example |
| 19 | 5 | — | — | — | — | — | 1447 | 101 | 302 | 1.27 | Comparative example |
| 20 | 6 | Yes | 1200 | Yes | 600 | 24 | 821 | 124 | 335 | 1.99 | Comparative example |
| 21 | 7 | Yes | 1200 | Yes | 600 | 44 | 338 | 135 | 352 | 2.29 | Comparative example |
| 22 | 8 | Yes | 1200 | Yes | 600 | 29 | 912 | 114 | 339 | 0.98 | Comparative example |
| 23 | 9 | Yes | 1100 | Yes | 650 | 70 | 290 | 138 | 372 | 0.78 | Example |
| 24 | 9 | Yes | 830 | Yes | 650 | 47 | 178 | 132 | 359 | 0.77 | Example |
| 25 | 9 | Yes | 750 | Yes | 650 | 38 | 98 | 133 | 338 | 0.79 | Comparative example |

The invention claimed is:

1. A cast steel characterized by
having a chemical composition comprising, by mass %,
C: 0 to 0.1%,
Si: 0 to 0.5%,
Mn: 0 to 0.5%,
S: 0 to 0.05%,
Ni: 29.0 to 34.0%,
Co: 0 to 8.0%, and
a balance Fe and unavoidable impurities and
having a 0.2% proof stress at 23° C. of 350 MPa or more,
a Young's modulus of 130 GPa or more, and
an average coefficient of thermal expansion at 18 to 28° C. of $2.0 \times 10^{-6}$/° C. or less.

2. The cast steel of claim 1 wherein an average grain size of an austenite structure of the low thermal expansion cast steel is more than 100 μm and less than 800 μm.

3. The cast steel according to claim 1, wherein the cast steel comprises Co: 4.9 to 8.0%.

4. A method for producing the cast steel of claim 1 characterized by comprising, in order, a first cryogenic treatment step of cooling a cast steel having a chemical composition of claim 1 from room temperature to the Ms point or below, holding the cast steel at a temperature less than or equal to the Ms point for 0.5 to 3 hours, and raising the cast steel to room temperature, a recrystallization step of heating the cast steel to 800 to 1200° C., holding the cast steel for 0.5 to 5 hours, then quenching, a second cryogenic treatment step of cooling the cast steel from room temperature to the Ms point or below, holding the cast steel at a temperature of the Ms point or less for 0.5 to 3 hours, and raising the case steel to room temperature, and a reverse transformation step of heating the cast steel to 550 to 700° C., holding the cast steel for 0.5 to 5 hours, and then quenching, thereby producing the cast steel of claim 1.

* * * * *